United States Patent
Davis

(10) Patent No.: US 10,268,041 B2
(45) Date of Patent: Apr. 23, 2019

(54) WEARABLE DISPLAY FOR STEREOSCOPIC VIEWING

(71) Applicant: Amalgamated Vision LLC, Rye, NY (US)

(72) Inventor: Adam J. Davis, Rye, NY (US)

(73) Assignee: Amalgamated Vision LLC, Brentwood, TN (US)

( * ) Notice: Subject to any disclaimer, the term of this patent is extended or adjusted under 35 U.S.C. 154(b) by 0 days.

(21) Appl. No.: 14/720,163

(22) Filed: May 22, 2015

(65) Prior Publication Data

US 2015/0338658 A1 Nov. 26, 2015

Related U.S. Application Data

(60) Provisional application No. 62/002,796, filed on May 24, 2014.

(51) Int. Cl.
| | |
|---|---|
| *G02B 27/01* | (2006.01) |
| *H04N 13/332* | (2018.01) |
| *G02B 27/22* | (2018.01) |
| *H04N 13/365* | (2018.01) |

(52) U.S. Cl.
CPC ....... *G02B 27/0172* (2013.01); *G02B 27/225* (2013.01); *H04N 13/332* (2018.05); *H04N 13/365* (2018.05); *G02B 2027/0178* (2013.01); *H04N 2213/001* (2013.01)

(58) Field of Classification Search
CPC .... G09G 3/003; G09G 2380/10; G02B 27/01; G02B 27/0172; G02B 2027/0178; G02B 2027/01; G06F 3/011; B60R 2300/205; G01C 21/365; F41F 3/225; H04N 13/0427; H04N 13/0429; H04N 2213/001; B60K 2350/2052; B60K 2350/2056; G09B 9/307; G09B 9/32; A42B 3/042

See application file for complete search history.

(56) References Cited

U.S. PATENT DOCUMENTS

| | | | |
|---|---|---|---|
| 5,309,276 | A | 5/1994 | Rodgers |
| 5,355,181 | A | 10/1994 | Ashizaki et al. |
| 5,467,104 | A | 11/1995 | Furness, III et al. |
| 5,701,132 | A | 12/1997 | Kollin et al. |
| 5,969,871 | A | 10/1999 | Tidwell et al. |

(Continued)

FOREIGN PATENT DOCUMENTS

EP 0562742 A1 9/1993

*Primary Examiner* — Premal R Patel
(74) *Attorney, Agent, or Firm* — Gesmer Updegrove LLP

(57) ABSTRACT

A wearable display apparatus for displaying an image has a source of modulated laser light and a scanning apparatus energizable to scan the modulated laser light from the source in a raster pattern and into the eye for forming an image. The scanning apparatus directs light into the eye of the viewer from a distance to the eye that is within the object focal length of the eye, positioned below the horizontal line of sight of the viewer, and disposed within a lower portion of the vertical peripheral field of view and substantially outside of the normal vertical field of view of the viewer. An optical fiber is disposed to direct the modulated laser light from the source to the scanning apparatus. A retaining band grips against the sides of the viewer's head and that seats the scanning apparatus against the viewer's face along or below the cheekbone.

19 Claims, 18 Drawing Sheets

(56) References Cited

U.S. PATENT DOCUMENTS

| | | |
|---|---|---|
| 5,982,555 A | 11/1999 | Melville et al. |
| 6,204,829 B1 | 3/2001 | Tidwell |
| 6,227,667 B1 | 5/2001 | Halldorsson et al. |
| 6,388,814 B2 | 5/2002 | Tanaka |
| 6,454,411 B1 | 9/2002 | Trumbull |
| 6,657,763 B2 | 12/2003 | Kobayashi |
| 7,023,402 B2 | 4/2006 | Lewis et al. |
| 7,071,931 B2 | 7/2006 | Tegreene et al. |
| 7,075,687 B2 | 7/2006 | Lippert et al. |
| 7,325,736 B2 | 2/2008 | Asai et al. |
| 7,375,701 B2 | 5/2008 | Covannon et al. |
| 7,436,568 B1 | 10/2008 | Kuykendall, Jr. |
| 8,791,990 B2 | 7/2014 | Luber et al. |
| 8,976,085 B2 | 3/2015 | Olsson et al. |
| 2004/0113867 A1* | 6/2004 | Tomine ............... G02B 27/0172 345/8 |
| 2005/0237271 A1* | 10/2005 | Yamamoto ........... G02B 27/017 345/8 |
| 2006/0291020 A1* | 12/2006 | Knox .................. G02B 5/0215 359/15 |
| 2008/0291277 A1* | 11/2008 | Jacobsen ............ G02B 27/0172 348/158 |
| 2009/0059381 A1* | 3/2009 | Jannard ................ A61B 5/1112 359/630 |
| 2011/0102558 A1 | 5/2011 | Moliton et al. |
| 2011/0214082 A1* | 9/2011 | Osterhout ............ G02B 27/017 715/773 |
| 2011/0242635 A1* | 10/2011 | Oka ................... G02B 27/0172 359/207.7 |
| 2012/0280893 A1* | 11/2012 | Holakovszky ....... G02B 27/017 345/8 |
| 2013/0214998 A1* | 8/2013 | Andes ................. G02B 27/017 345/8 |
| 2014/0139404 A1* | 5/2014 | Takeda ............... G02B 27/017 345/8 |
| 2014/0146394 A1* | 5/2014 | Tout ...................... G09B 9/307 359/630 |

* cited by examiner

WEARABLE DISPLAY FOR STEREOSCOPIC VIEWING

CROSS REFERENCE TO RELATED APPLICATIONS

This application claims the benefit of U.S. Provisional application No. 62/002,796 provisionally filed on May 24, 2014, entitled "Laser Based MEMS Display for Medical Applications", in the names of Adam Davis et al., incorporated herein in its entirety.

TECHNICAL FIELD

The present invention relates generally to wearable displays that generate stereoscopic images and more particularly relates to a wearable display that directs modulated light toward the eye of the viewer from a lower portion of the peripheral field of vision.

BACKGROUND

There have been a number of solutions proposed for providing image content from wearable devices. Various types of goggles, glasses, and other apparatus have been described for displaying image content to a viewer who is wearing the apparatus. These devices may be completely immersive, so that the viewer sees only images generated by the apparatus and has no ability to see the outside world when wearing the device. Alternately, varying degrees of visibility of the real world are provided with other designs, so that the generated images are superimposed on the real-world image as an augmented display or, in some way, used to complement the real-world visual content that lies in the viewer's field of view.

Wearable display devices offer considerable promise for providing information and displaying complementary imagery that can improve performance and efficiency in a number of fields. In medicine and dentistry, for example, the capability to view image content that had been previously stored and, optionally, post processed, or is currently being acquired from another vantage point can help the practitioner to more accurately obtain detailed data that would aid diagnosis and treatment. Imaging data that is currently available only from high-cost 3-D imaging systems can be provided in a useable format for viewing on less expensive wearable imaging equipment that allows the practitioner to have this information in an active clinical setting. Stereoscopic imaging, with its enhanced spatial understanding and improved presentation of relevant detail, can be particularly useful for those treating patients using medical imaging guidance or medical data, as well as for those skilled in other fields.

With many of the apparatus that have been proposed for wearable displays, the viewer is encumbered by the device in some way, due to device size, bulkiness and discomfort, component and image positioning, poor image quality, eye fatigue, and other difficulties. Although many clever solutions for providing a more natural viewing experience have been outlined, and a number of advances toward improved image quality have been introduced, the form factors for many of these solutions still make it difficult to win broad-based acceptance for these devices, particularly for long-term use. Their bulky size and appearance are still considered to be significant factors in limiting the appeal of wearable imaging devices for many people.

Despite years of design effort and optimization, including integration of miniaturization and improved imaging technologies, designing wearable display apparatus with acceptable ergonomics and high image quality has proved to be a continuing challenge. Workable solutions for wearable display devices that have a natural "feel" and that can be easily worn and used remain elusive. Thus, it can be appreciated that there is a need for a wearable device for stereoscopic display that provides high image quality and is lightweight, inexpensive, easy to use, and ergonomically less invasive and cumbersome than conventional designs.

SUMMARY

It is an object of the present invention to advance the art of stereoscopic presentation from a wearable viewing apparatus. Embodiments of the present disclosure provide a wearable viewing apparatus that provides a high quality stereoscopic display with little or no impediment to viewer visibility over the field of view. Embodiments of the present disclosure can provide an improved viewing apparatus that reduces a number of optical, physiological, and ergonomic constraints of conventional stereoscopic imaging devices. Embodiments of the present disclosure can provide a wearable viewing apparatus having increased field of view with versatile arrangements of scanning, beam width adjustment, and related optical components in a near-eye imaging arrangement.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the present invention, there is provided a wearable display apparatus for displaying an image to an eye of a viewer comprising:

a) a source of modulated laser light;

b) a scanning apparatus that is energizable to scan the modulated laser light from the source in a raster pattern and into the eye of the viewer for forming an image, wherein the scanning apparatus for the eye is:

(i) disposed to direct light into the eye of the viewer from a distance to the eye that is within the object focal length of the eye of the viewer;

(ii) positioned below the horizontal line of sight of the viewer; and (iii) disposed within a lower portion of the vertical peripheral field of view of the viewer and substantially outside of the normal vertical field of view of the viewer;

c) an optical fiber disposed to direct the modulated laser light from the source to the scanning apparatus; and d) a retaining band that grips against the sides of the viewer's head and that seats the scanning apparatus against the viewer's face along or below the cheekbone.

From an alternate aspect, an embodiment of the present disclosure provides a wearable display apparatus for displaying a stereoscopic image pair to the left and right eyes of a viewer comprising:

a) a source of modulated laser light for each eye;

b) a scanning apparatus for each eye that is energizable to scan the modulated light from the source in a raster pattern and into the eye of the viewer for forming an image, wherein the scanning apparatus for each eye is:
  (i) disposed to direct light into the eye from a distance to the eye that is within the object focal length of the eye of the viewer;
  (ii) positioned below the horizontal line of sight of the viewer;
  (iii) disposed within a lower portion of the vertical peripheral field of view of the viewer and substantially outside of the normal vertical field of view of the viewer;
c) a corresponding right eye optical fiber and left eye optical fiber disposed to direct the modulated laser light from each corresponding source to each corresponding scanning apparatus;
and
d) a retaining band that grips against the sides of the viewer's head and that seats each scanning apparatus against the viewer's face along or below the cheekbone.

From another alternate aspect, an embodiment of the present disclosure provides a wearable display apparatus for forming a stereoscopic pair of virtual images to the left and right eyes of a viewer, the apparatus comprising, for forming each image of the stereoscopic pair:
a) a source of modulated laser light that is energizable to direct light having a first beam width into an optical fiber;
c) the optical fiber disposed to direct the modulated laser light from the source to a beam expander;
d) the beam expander comprising two or more lens elements that expand the modulated laser light to a second beam width that is larger than the first beam width;
e) a scanning apparatus that is disposed to direct the modulated light of the second beam width to a microelectromechanical systems device that is energizable to scan the modulated light in a raster pattern and toward the eye of the viewer for forming an image,
wherein the scanning apparatus for the eye is disposed within a retaining band that grips against the sides of the viewer's head and that seats the scanning apparatus against the viewer's face along or below the cheekbone; and
f) a relay lens element in the path of light from the microelectromechanical systems device and disposed within the object focal length of the eye of the viewer.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION

Figure 1A:
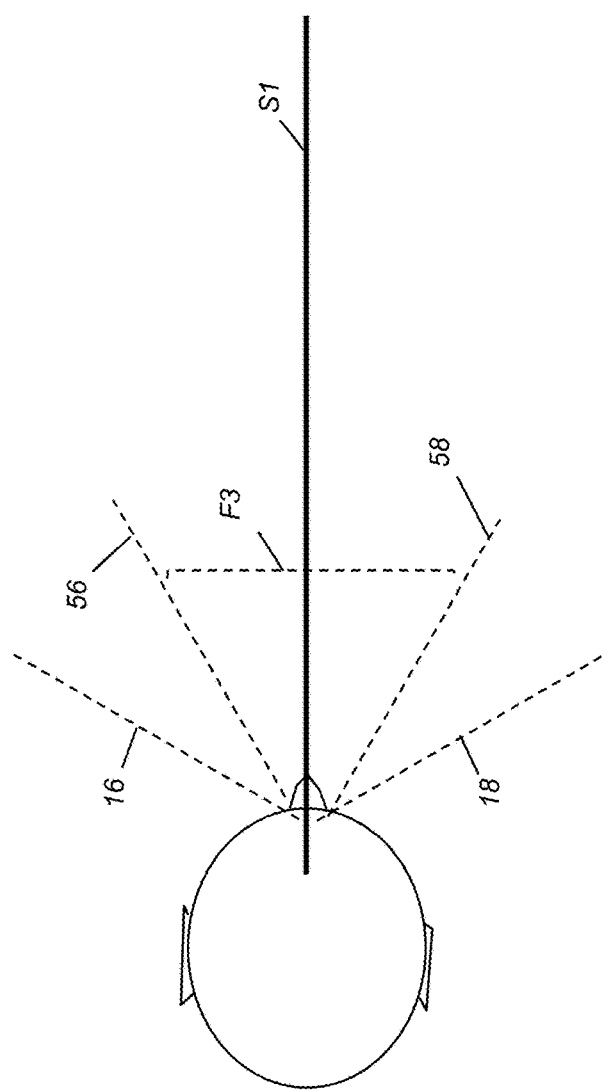
FIG. 1A is a schematic top view that shows the horizontal field of view of a viewer.

Figures provided herein are given in order to illustrate principles of operation and component relationships along their respective optical paths according to the present invention and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description of the invention. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, the term "energizable" describes a component or device that is enabled to perform a function upon receiving power and, optionally, upon also receiving an enabling signal.

In the context of the present disclosure, positional terms such as "top" and "bottom", "upward" and "downward", and similar expressions are used descriptively, to differentiate different surfaces or views of an assembly or structure and do not describe any necessary orientation of the assembly in an optical apparatus.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the term "left eye image" describes a virtual image that is formed in the left eye of the viewer and a "right eye image" describes a corresponding virtual image that is formed in the right eye of the viewer. The phrases "left eye" and "right eye" may be used as adjectives to distinguish imaging components for forming each of the two images of a stereoscopic image pair, as the concept is widely understood by those skilled in the stereoscopic imaging arts.

The term "oblique", where used in the present disclosure, describes an angular relationship that is not parallel or normal, that is, other than an integer multiple of 90 degrees. In practice, two optical surfaces are considered to be oblique with respect to each other if they are offset from parallel or normal by at least about +/−2 degrees or more. Similarly, a line and a plane are considered to be oblique to each other if they are offset from parallel or normal by at least about +/−2 degrees or more. Substantially parallel planes are parallel to within +/−2 degrees. Likewise, substantially parallel beams are parallel to within about +/−2 degrees.

In the context of the present disclosure and claims, the term "about", when used with reference to a measurement, means within expected tolerances for measurement error and inaccuracy that are accepted in practice. Some reasonable tolerance must be allowed, for example, for measurement differences in determining the extent of a particular viewer's visual field, as it would vary from the measurement of one practitioner to another.

Microelectromechanical systems (MEMS) devices include a number of mechanical components that provide systems of miniaturized mechanical and electromechanical elements (that is, devices and structures) that are made using microfabrication techniques analogous to those used for forming semiconductor devices. MEMS devices can vary from relatively simple structures having no moving elements, to extremely complex electromechanical systems with multiple moving elements under the control of integrated microelectronics. In a MEMS device, at least some of the elements have a mechanical function, whether or not the elements are themselves movable. MEMS devices can alternately be termed "micro-machined devices" or devices formed and operating using microsystems technologies. Physical dimensions of individual MEMS mechanical elements can range from well below one micron to several millimeters. In the context of the present disclosure, MEMS devices provide mechanically movable elements, such as reflectors, that are energizable to temporally and spatially modulate light in order to provide a virtual image using a raster scan pattern.

It is useful to distinguish real images from virtual images, as generated by an optical system. A real image can be formed on a display surface, for example. In contrast to methods for forming a real image, a virtual image is not formed on a display surface. That is, if a display surface were positioned at the perceived location of a virtual image, no image would actually be formed on that surface. A virtual image is formed by an optical system that directs light to the eye at angles that emulate viewing parameters for real objects, such as far point, apparent angular width, and other characteristics related to visual perception. Virtual image display has a number of inherent advantages for stereoscopic viewing. For example, the size of a virtual image is not limited by the size or location of an actual object or display surface. Additionally, the source object for a virtual image may be small; a magnifying glass, as a simple example, provides a virtual image of its real object. It is known that, in comparison with systems that project a real image, a more realistic viewing experience can be provided by forming a virtual image that is disposed to appear some distance away, beyond the physical limits of the optical system. Providing a virtual image using only modulated light also obviates any need to compensate for screen distortion or other display artifacts, as may be necessary when projecting a real image.

In conventional use, the term "field of view" (FOV) broadly relates to the overall visual field that is available to a viewer with relatively normal eyesight under daylight viewing conditions. Field of view is typically measured in orthogonal horizontal and vertical directions. FIG. 1A shows how angular portions of the horizontal field of view are defined according to the present disclosure. Horizontal monocular visual limits are generally considered to be slightly in excess of 120 degrees, centered about a central horizontal line of sight S1, as bounded between lines 16 and 18. Symbol recognition in the horizontal FOV is generally considered to be in the area indicated as F3, about +/−30 degrees from horizontal line of sight S1, as bounded between lines 56 and 58.

Figure 1B:
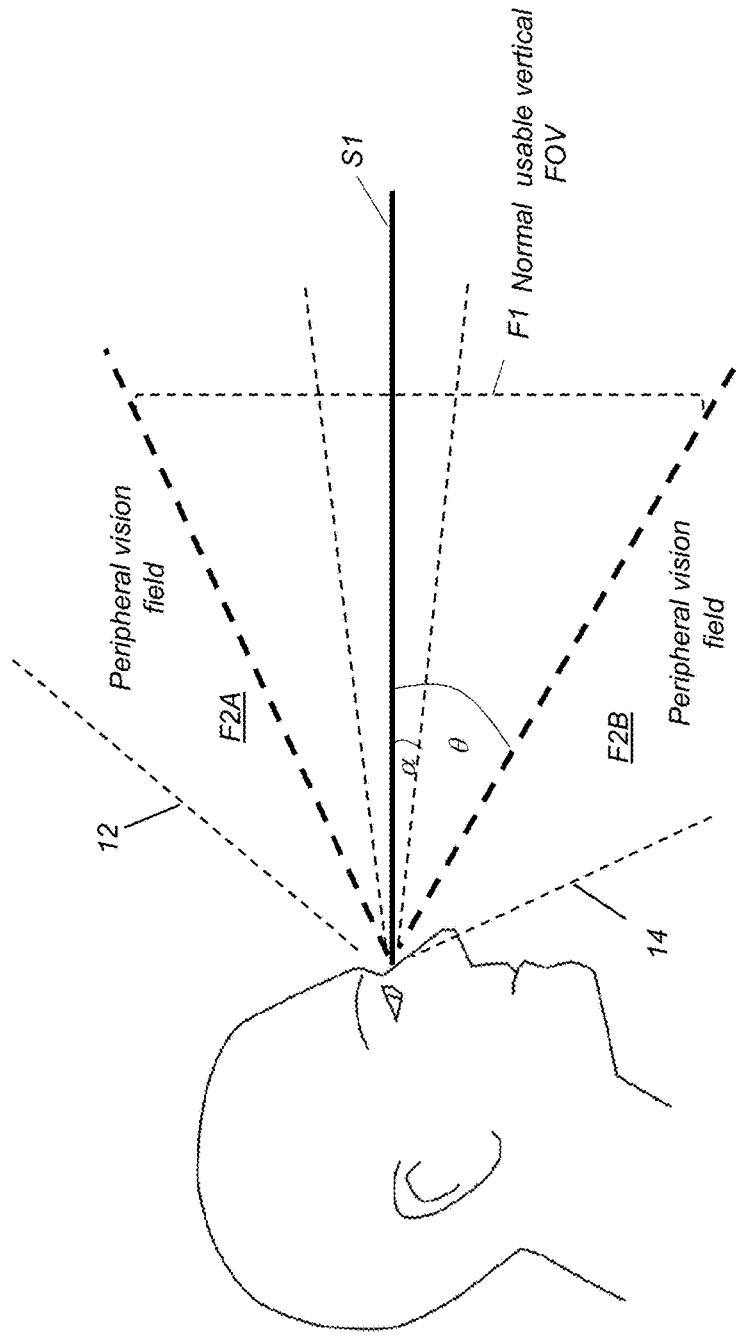
FIG. 1B is a schematic side view that shows the vertical field of view of a standing viewer looking forward, with normal and peripheral fields of view.

The vertical field of view, as this measurement is referred to herein, is shown schematically in FIG. 1B. A horizontal line of sight S1 is defined, extending generally at about 0 degrees to horizontal for a viewer who is standing, varying from true horizontal by no more than about +/−2 degrees, such as according to a person's posture or other anatomical characteristics. The full vertical FOV for an adult viewer having normal vision generally extends from about 60 degrees above (expressed as +60 degrees) to about 75 degrees below horizontal (expressed as −75 degrees); the normal "usable" vertical field of view (FOV) F1 for display of a virtual image is typically considered to be defined within the range of angles from about +25 degrees above to −30 degrees, with angles below the horizontal line of sight S1 assigned a negative value.

Different portions of the field of view can be distinguished from each other. Foveal vision, having the highest visual acuity due to the greatest retinal cone density, encompasses the central portion of the human visual field. This region uses approximately 50% of our optical pathway. Parafoveal vision, providing high quality acuity and color vision as well, due to a high retinal cone concentration, is thus generally considered to be at an angle $\alpha$ that is within no more than about +/−5 degrees of the line of sight. The approximately ten-degree parafoveal visual field is generally circular about the line of sight with about a four-inch diameter at a distance of 22 inches. As an approximation for an adult viewer, this region would be slightly smaller than the surface of a standard compact disc (CD) or digital video disc (DVD) held out at arm's length. Outside of this region, the visual field is considered to be peripheral and provides increasingly less visual information. Due to the retinal rod distribution of the human eye, the bulk of peripheral visual information lies within about the first 20 degrees beyond the parafoveal field of view.

Figure 1C:
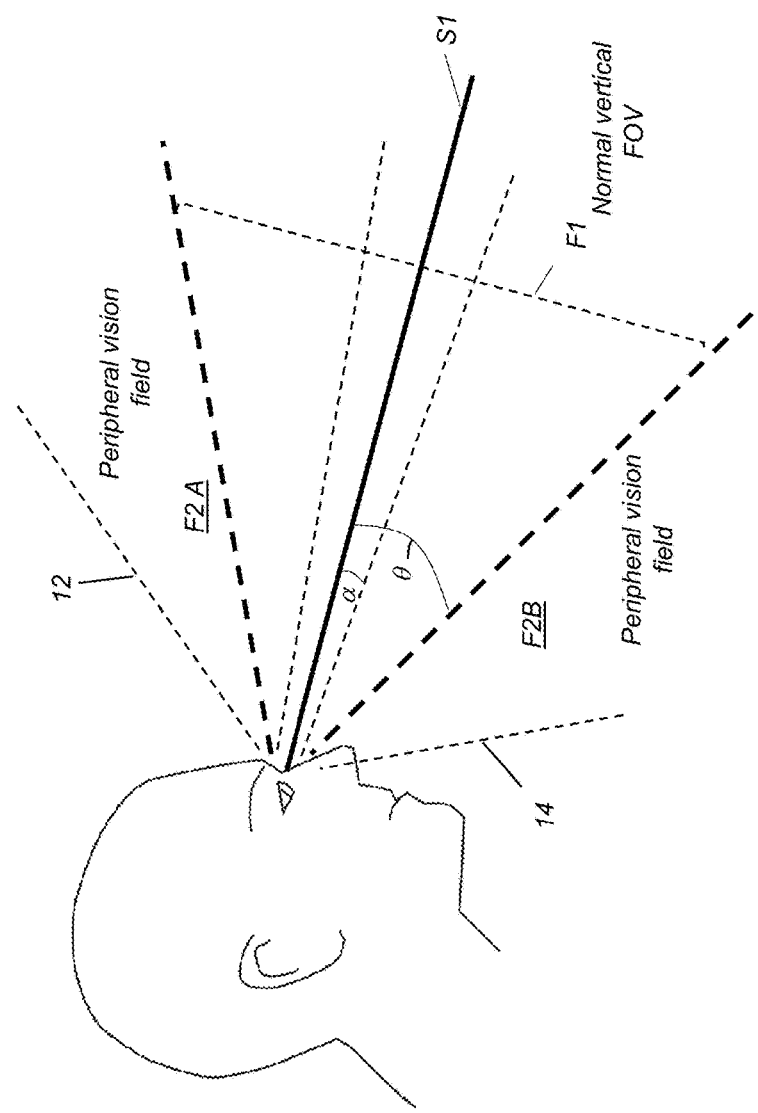
FIG. 1C is a schematic side view that shows the vertical field of view of a seated viewer looking forward, with normal and peripheral fields of view.

For the embodiments described herein, a normal usable vertical FOV F1 is larger than the parafoveal FOV and is defined as being within the range from about +25 to −30 degrees of the line of sight. FOV F1 is considered generally to be within the limits of color discrimination, which degrades substantially for vision angles increasingly outside this region. FIGS. 1B and 1C show the lower portion of the normal vertical FOV F1, below forward horizontal line of sight S1, as bound within an angle θ of horizontal line of sight S1. The region that lies within the +60 to −75 degree vertical visual limits of the viewer but in the regions above or below the normal vertical FOV F1 is considered to be the "vertical peripheral vision" field or, simply, a peripheral vertical field with upper and lower portions F2A, F2B, respectively.

FIG. 1B shows the two portions of the peripheral vertical field, an upper portion F2A above the line of sight S1 and a corresponding lower portion F2B below horizontal line of sight S1. Upper portion F2A lies between about 60 degrees from line of sight S1, shown by a line 12, and the upper definition of FOV F1 which is about 25-30 degrees above line of sight S1. A lower portion F2B of the peripheral vertical field lies below FOV F1 which extends down to about −30 degrees; portion F2B is bounded by about −75 degrees from line of sight S1, shown by a line 14. Thus, lower portion F2B of the peripheral vertical FOV lies between about −30 and −75 degrees relative to horizontal light of sight S1.

Line of sight S1 generally tracks head position. For a seated viewer, for example, the reference line of sight S1 tends to shift downwards to about 15 degrees from horizontal. All of the other vertical coordinates and angles that define parafoveal and peripheral fields shift accordingly, as is shown schematically in FIG. 1C. In the context of the present disclosure, the reference line of sight S1 for vertical fields is considered to correspond to the horizontal for a standing viewer, tilted to about 15 degrees from horizontal for a seated viewer. This line of sight is termed a horizontal line of sight in the description that follows.

Figure 1D:
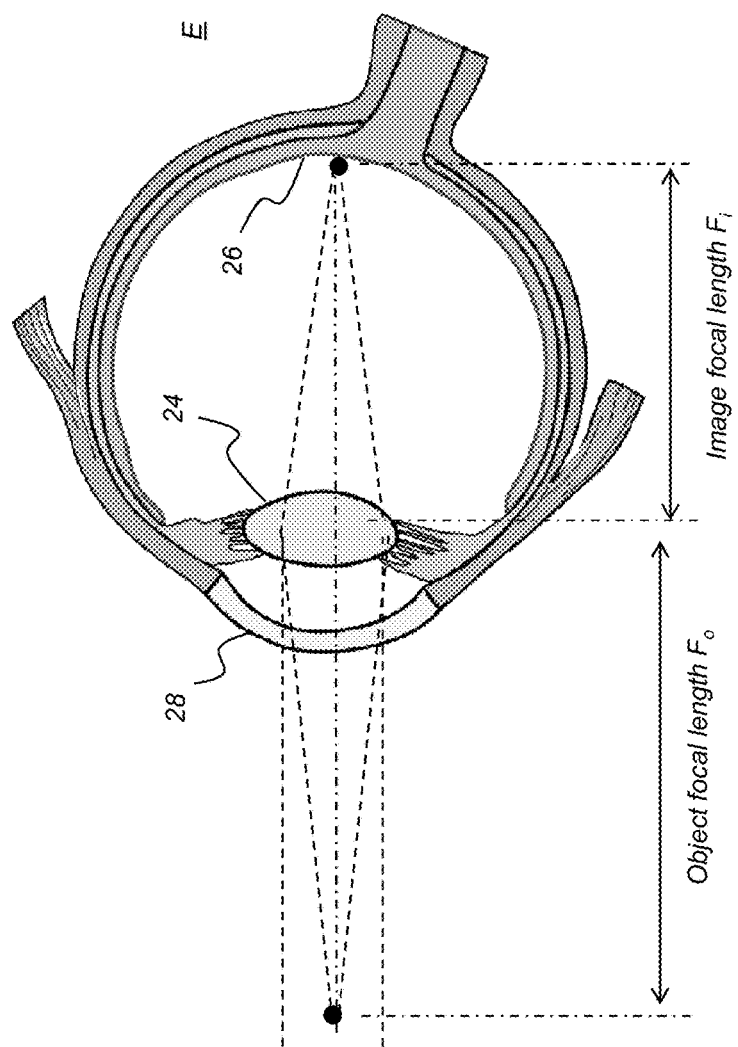
FIG. 1D is a cross section view showing portions of the eye and object and image focal lengths of the eye.

As shown in the cross-sectional side view of FIG. 1D, the optics system of the human eye E, considered as an optical component primarily with lens 24 and cornea 28, has focal lengths that are determined by the geometry of the lens 24, cornea 28, and the surrounding medium. For an adult with normal, uncorrected vision, the eye E has an object focal length $F_o$ of about 16.7 mm. The normal, uncorrected adult human eye E has an image focal length $F_i$ of about 22.3 mm. The object focal length $F_o$ is in air; the image focal length $F_i$ is within the refractive liquid medium of the eye E, which effectively shortens the actual distance dimensions as shown in FIG. 1D. The iris, which forms the pupil of the eye as an imaging system and limits the aperture to less than about 7 mm, is not shown for clarity in FIG. 1D. Under bright light conditions, the pupil diameter controlled by the iris averages only about 2.5 mm. A "normal" eye can focus parallel light rays from a distant object onto the retina 26, with the parallel rays considered to be at infinity, to a point on the retina 26 at the back of the eye E, where processing of the visual information begins. As an object is brought close to the eye E, however, the muscles change the shape of the lens 24 so that rays form an inverted real image on the retina 26. The theoretical region of focus in front of the lens is the object image zone.

Block Diagram

Embodiments of the present disclosure provide a wearable imaging apparatus that is advantaged over earlier designs from a number of aspects. The wearable imaging apparatus provides stereoscopic imaging by scanning collimated, coherent light from solid-state lasers directly into each eye of the viewer, to form a virtual image onto the viewer's retina. Unlike other proposed solutions for wearable imaging devices, embodiments of the present disclosure can have an extremely low profile, without requiring lenses or display surfaces in the normal usable visual field. Significantly, the configuration of system optics allows all imaging components to be disposed outside of the normal field of view, so that the viewer has the capability to view the virtual image as needed, without having obstruction of the real world view.

Figure 2:
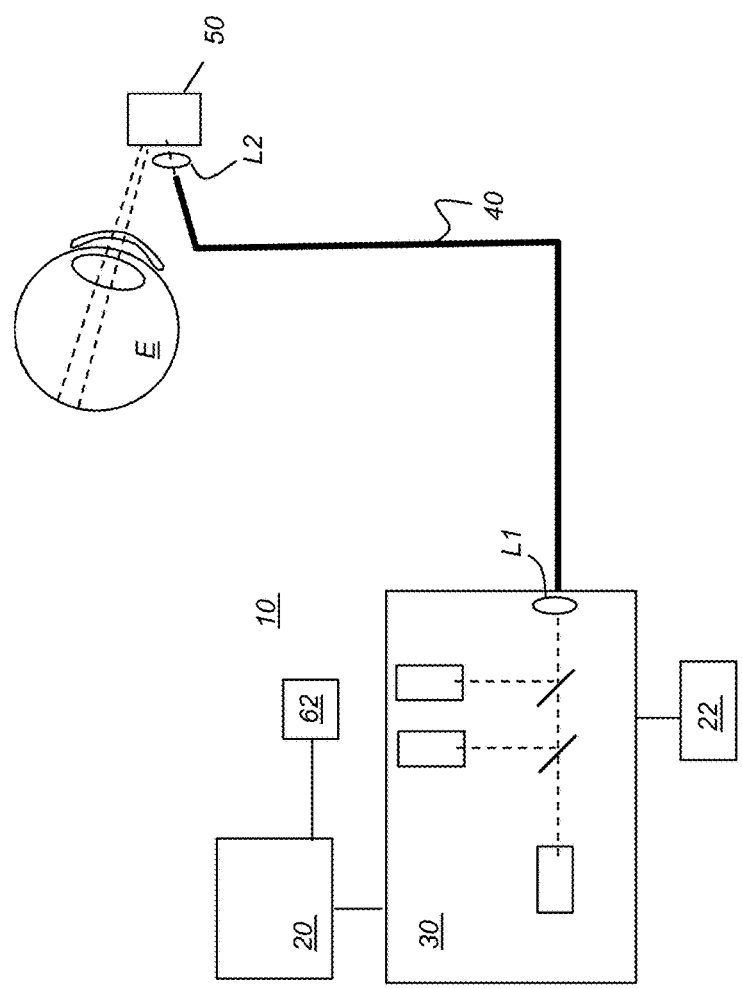
FIG. 2 is a schematic block diagram that shows components of a wearable imaging apparatus according to an embodiment of the present disclosure.

The schematic block diagram of FIG. 2 shows components of a wearable imaging apparatus 10 according to an embodiment of the present disclosure. A control logic processor 20 obtains image data, either from a memory or from some other image source, such as via wireless transmission (e.g. Bluetooth), and provides the necessary timing and control signals for forming the image in each eye E of the viewer. Control logic processor 20 is in signal communication with a light module 30 and modulates the light from module 30 in order to provide color image content. Frequency, duration, intensity and color modulation is provided. According to an embodiment, light module 30 provides modulated light from red, green, and blue laser diodes 32r, 32g, and 32b, respectively, coupled along an optical path and through an optional objective lens L1 to a light guide, such as an optical fiber 40. The modulated light is characterized by pulses of laser light of variable color, duration and intensity. This light must be raster-scanned in order to form a recognizable image. Optical fiber 40 directs the source light to a MEMS scanner apparatus 50, such as through an optional collimator lens L2. The optional collimator lens L2 can alter focus in addition to beam size. Optional beam expanders can alternately be used, as described in more detail subsequently. When energized, the MEMS scanner apparatus 50 scans by reflecting the light from optical fiber 40 into eye E in a raster scanning pattern. Power is provided by a power source 22, such as a battery.

To provide stereoscopic imaging, an optical fiber 40 and scanner apparatus 50 are provided for each eye E. (Only the system for a single eye E is shown in FIG. 2 for clarity.) The same light module 30 can be used to generate images for both eyes, such as synchronously generating left- and right-eye modulated light; alternately, each eye E can have a separate light module 30, with appropriate image processing logic, provided by control logic processor 20 and appropriate light handling components for the optical path that forms each left-eye and right-eye image.

Light module 30 can be a commercially available modular component for generating modulated light according to input image data, such as a pico-projector device from Microvision, Inc., Redmond, Wash. for example. By way of example only, this device forms an image using light from three primary color laser diodes, at 638 nm (Red), 517 nm (Green), and 450 nm (Blue). Other wavelengths can be used for primary colors. The lasers are low-power Class 1 devices, whose light can be directed into the eye of a viewer without concern for energy levels that are considered to be harmful. Light from each of the primary color lasers can be provided separately, so that red, green, and blue beams are provided in rapid sequence. Alternately beams of the different primary wavelengths are combined for forming the color image. Techniques for beam combination include the use of dichroic combiners, for example. Spot sizes for the light beams can be varied from each other, such as for improved efficiency. The light beams can be collimated to provide the smallest optimal size or enlarged to overfill a small or large MEMS scanning mirror, as described in more detail subsequently. Beams can be converted from a generally Gaussian profile to a flat-top profile for improved beam homogeneity.

An exemplary optical fiber 40 can be a single-mode optical fiber. This type of light guide can be easily fitted into the band that is used for fitting the scanner apparatus 50 against the viewer's face, as described subsequently. The optical fiber can have an angled or otherwise shaped termination, such as to prevent back reflection. A single fiber can be used for guiding light from all of the laser diodes 32r, 32g, 32b. Alternately, three fibers can be used, spliced together to form a single fiber at the light output at scanner apparatus 50.

The optical components of scanner apparatus 50 used in a particular wearable imaging apparatus 10 can vary and may include, in addition to a MEMS scanner device, alternate types of reflective and refractive relay optics, folding optics that may or may not provide optical power, and other components that are used to scan image content into eye E. Alternate components that may be part of scanner apparatus 50 are described with reference to subsequent embodiments of the present disclosure.

Configuration of the Optical Components about and Against the Face

Figure 3A:
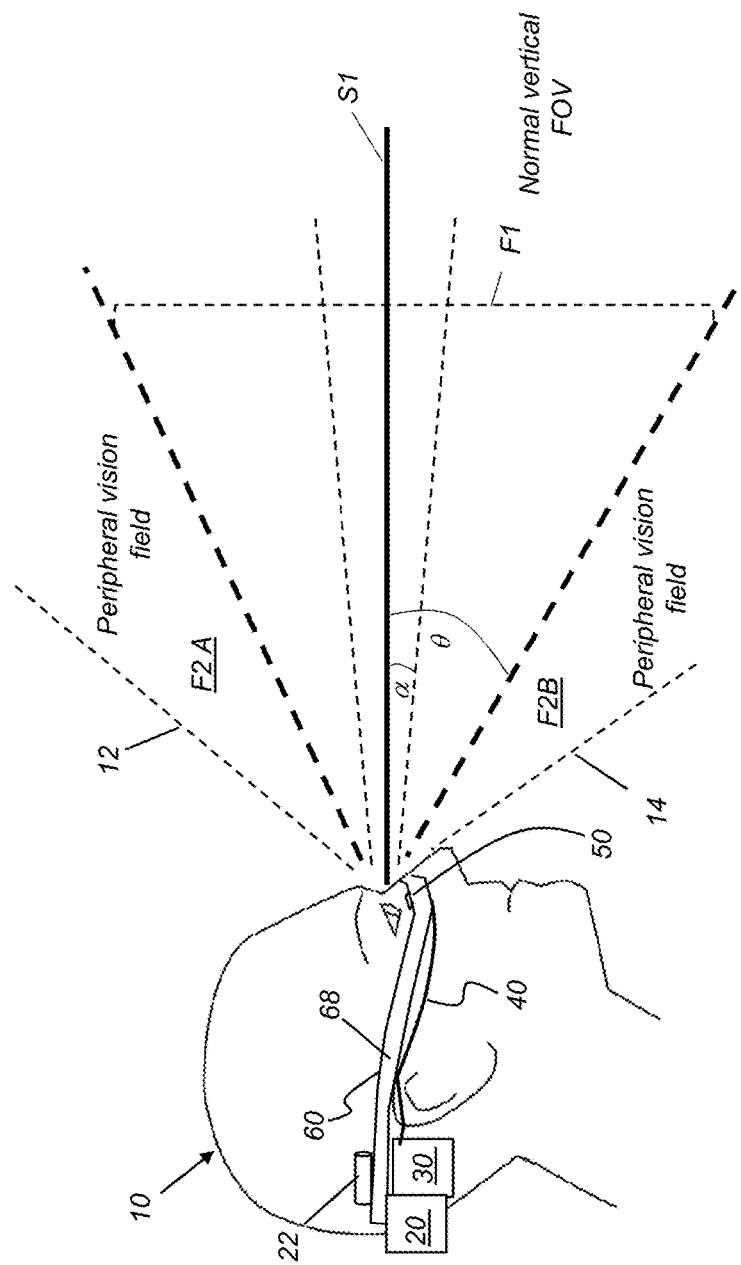
FIG. 3A is a schematic side view showing the wearable imaging apparatus as worn by a viewer.
Figure 3B:
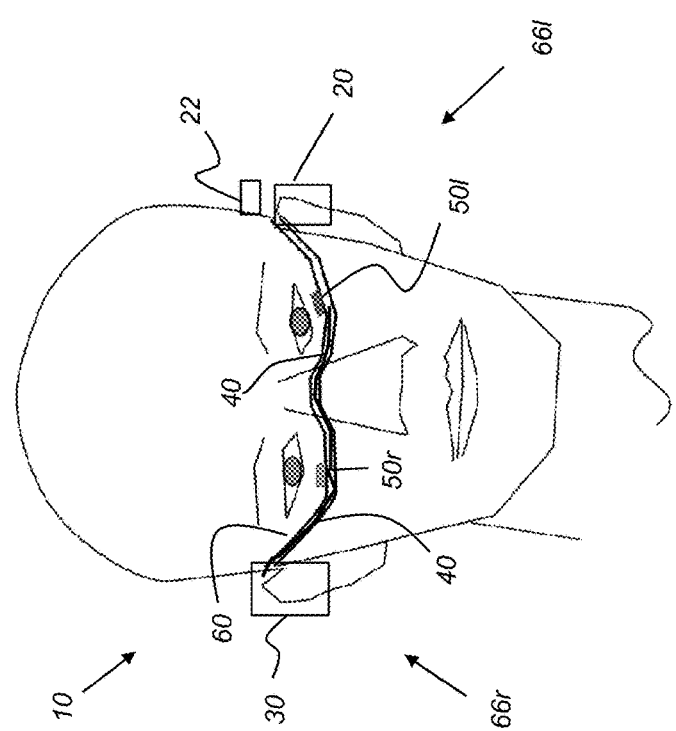
FIG. 3B is a schematic front view showing the wearable imaging apparatus as worn by a viewer.
Figure 3C:
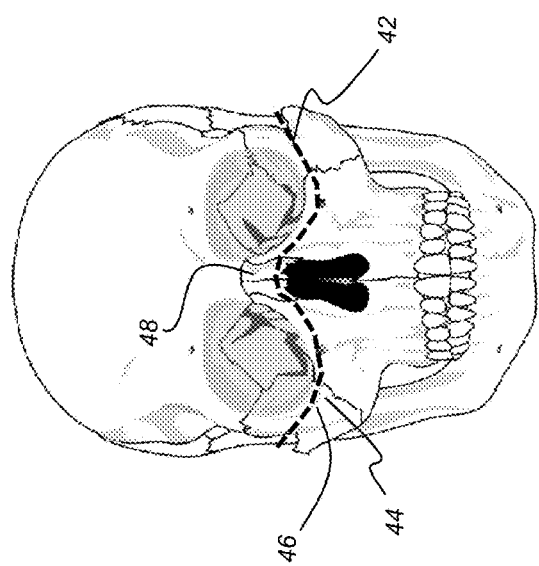
FIG. 3C is a front view of the skull of a viewer showing anatomy that supports a band for the wearable imaging apparatus.

FIGS. 3A-3C show various ways in which the components of wearable imaging apparatus 10 can be arranged and worn with respect to the viewer. In order to keep the apparatus lightweight and unobtrusive, light module 30 can be positioned away from the front of the face. According to an embodiment of the present disclosure, some or all of control logic processor 20, light module 30, and battery 22 components are positioned within or along a retaining band 60 and at a position removed from the area of the viewer's eyes, such as along the top or back of the head, along the temples, or generally along the sides or the head, typically behind the pinna. This arrangement can help to counteract the weight of scanning components that are supported near the eye, for example. Components can be placed along the viewer's temple and/or partially or wholly behind the pinna 68. The originating image source can be separate from wearable imaging apparatus 10, such as in wireless communication with control logic processor, for example.

According to an alternate embodiment of the present disclosure, one or more of light module 30, battery 22, and control logic processor 20 can be mounted outside of retaining band 60, such as along the viewer's neck or chest, for example, or in a pocket or other convenient holder.

The light from light module 30 is directed to scanner apparatus 50 through optical fiber 40, so that scanner apparatus 50 can be configured with only a small number of components seated against the viewer's face that provide the raster scan and form the image from the source light. Facial retaining band 60 fastens about or against the head of the viewer and is configured to position scanner apparatus 50 in front of and below the viewer's eyes in the peripheral field of vision for image display. In terms of the FOV regions defined previously with respect to FIGS. 1B and 1C, retaining band 60 disposes at least a substantial portion of scanner apparatus 50, that is, at least 50% or more, outside the normal vertical FOV and in the lower peripheral vision field F2B, relative to a viewer who is looking forward and standing or seated. According to an alternate embodiment of the present disclosure, essentially all of scanner apparatus 50 that directs light into the retina is positioned in the lower peripheral vision field F2B of the viewer who is looking forward along a horizontal line of sight. That is, all of the components that seat against the viewer's face lie below a horizontal line of sight S1 by at least 30 degrees. Wires for power and control signals are also provided along retaining band 60, such as within the band 60 structure.

FIG. 3B is a front view that shows left-eye and right-eye scanner apparatus 50l, 50r positioned for the left and right eyes of the viewer, respectively. In the embodiment shown, shared light module 30 provides modulated laser light for each eye, directed as timed pulses along different optical fibers 40 over different time intervals or otherwise synchronized with the two scanner apparatus 50l, 50r for delivering the intended light signal to each eye. A left-eye optical system 66l comprises light module 30, optical fiber 40, and scanner apparatus 50l; a right-eye optical system 66r comprises the same light module 30, with a separate length of optical fiber 40 and a separate scanner apparatus 50r.

The skull diagram of FIG. 3C shows the placement of imaging apparatus 10 on the face relative to underlying anatomy of the viewer. A dashed line 42 shows generally where band 60 is supported against the facial osseous structures. As line 42 shows, band 60 is stabilized against portions of the facial osseous structures including the zygomatic body, or cheekbone (maxilla) 44. The support portion for retaining band 60, as traced in line 42, extends along the infraorbital rim 46 that lies at the maxilla. Mid portions of the band 60 rest on the nasal bone 48, at the nasion. No portion of the band 60 or near-eye optical system is positioned above the eyes.

When supported using retaining band 60, scanning apparatus 50 has the following placement relative to each eye:
  (i) disposed so that the optical element of scanning apparatus 50 that is positioned nearest to the eye is at a distance from the eye that is within the object focal length $F_o$ of the eye of the viewer, as defined herein;
  (ii) disposed below the horizontal line of sight and substantially outside of the normal usable vertical field of view of the viewer, that is, with none, or substantially none, or at least less than half of scanning apparatus 50 and front portions of band 60 visible to the viewer within the normal usable vertical field F1 of the viewer as defined with regard to FIGS. 1B and 1C, and
  (iii) within the lower portion F2B of the peripheral field of view of the user, as defined with regard to FIGS. 1B and 1C.

"Substantially none" as used hereinabove means less than about 20 percent of the retaining band 60 is visible to the viewer within the normal usable vertical field F1 of the viewer, preferably less than about 10 percent or even with none of band 60 viewable within the normal usable vertical field F1 of the viewer.

The optical element that lies nearest to the eye within the object focal length $F_o$ as specified in (i) above may be the MEMS scanner device itself or may be an optical relay element such as a relay lens or other component, as described in more detail subsequently.

Band 60 grips against the sides of the viewer's head at pinna 68 as shown in FIG. 3A. This arrangement can help to stabilize component position and support the weight of components on band 60.

The arrangement with band 60 resting against portions of the face below the eyes, seated against the face along and even below each eye, at the anterior maxilla adjacent to the nose and nasal alar, allows the extremely low-profile design of wearable imaging apparatus 10 to form a virtual image without blocking the standard field of view for the viewer when the viewer is standing or seated and looking forward. When the viewer is observing real-world scene content that lies ahead, the view is thus substantially unobstructed. Then, when the viewer's interest is in the virtual image, the viewer looks slightly downward toward the MEMs scanner device and related components of scanner apparatus 50 in band 60.

Figure 3D:
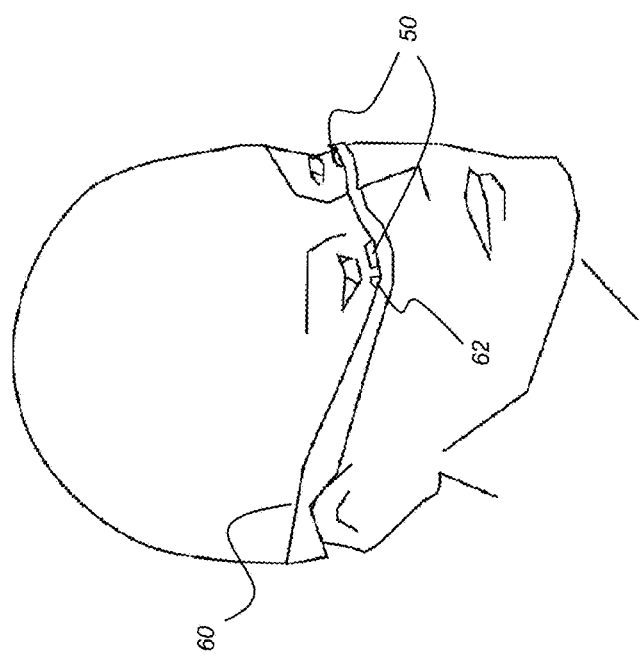
FIG. 3D is a perspective view that shows a viewer wearing the wearable imaging apparatus.

According to an alternate embodiment of the present disclosure, as shown in FIG. 3D, a sensor 62, such as an infrared light sensor, is used to detect the gaze direction of the viewer and to provide a signal that, when sensed at control logic processor 20 (FIG. 2), energizes scanning apparatus 50 or light module 30 when the viewer is looking into scanner apparatus 50. Sensors capable of detecting the gaze of a viewer are known to those skilled in the image display arts and can be used to energize or de-energize one or both of scanning apparatus 50 and lasers in light module 30. In this way, the virtual image content can be generated and displayed only when the downward glance of the viewer indicates interest in the virtual image.

Figure 3E:
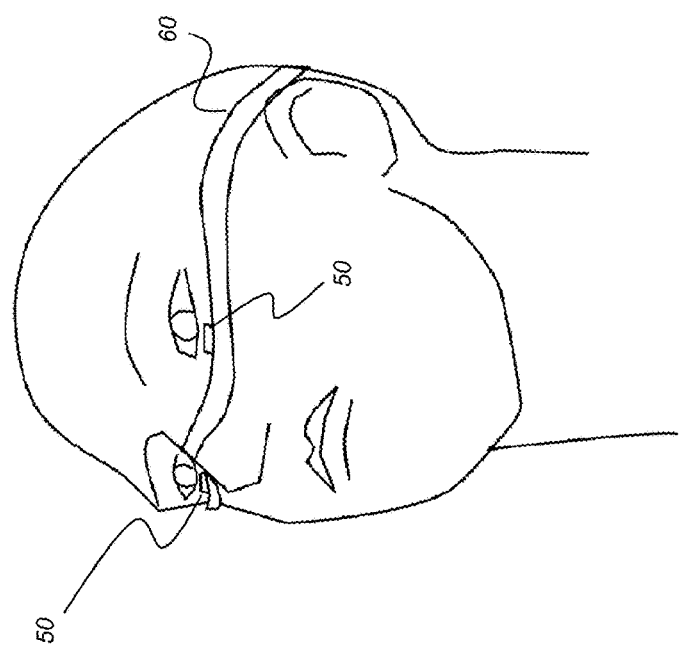
FIG. 3E is a perspective view that shows a viewer wearing the wearable imaging apparatus.

Advantages of the band 60, and consequently of scanner apparatus 50 placement, for medical uses are similar to advantages for a viewer who wears reading glasses oriented below the normal vertical field of vision. This viewer can use unaided vision or magnified vision as is typical in the operating room for observing scene content without obstruction, but can raise the chin or lower the head for viewing medical images or medical informatics for one example. FIGS. 3D and 3E show different perspective views of a viewer wearing band 60. Band 60 grips against the sides of the viewer's head, such as using a hinged arrangement or using an internal structure formed of spring wire or other shape- or curvature-retaining material or can be bound behind the head of the viewer, such as with an elastic banding or may grip the viewers head near the pinna, supported by the ears as with conventional eyeglasses. Alternate embodiments can use a strap across the top of the head for holding band 60 in place.

Operational Aspects of the Imaging System

Figure 4A:
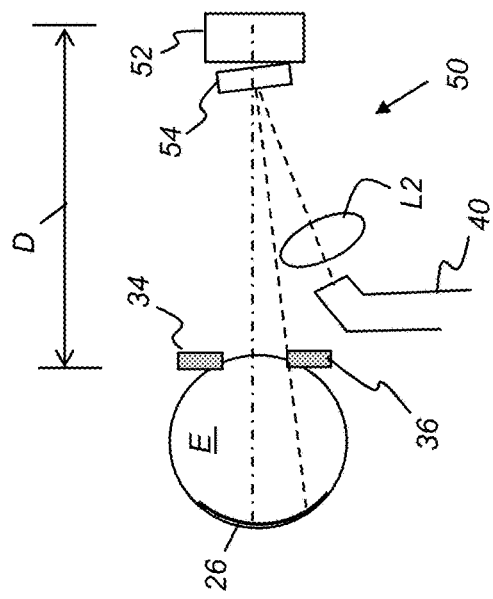
FIGS. 4A and 4B are schematic views that show scanning apparatus relative to the eye of a viewer.
Figure 4B:
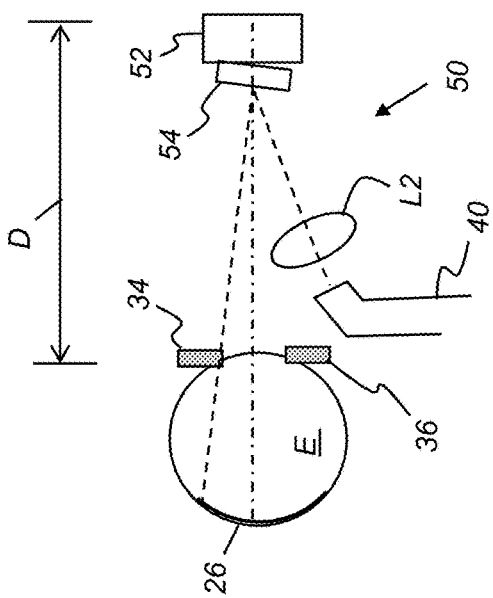

The section views in FIGS. 4A and 4B show, in top view schematic form and not to scale, how scanner apparatus 50 forms the virtual image by scanning laser light from optical fiber 40 into eye E, depicted at two different scan angular positions relative to the horizontal or x-plane. Eye E has a pupil formed by the iris, represented schematically as aperture stops 34, 36. Scanner apparatus 50 uses a MEMS scanner device 52 that actuates a mirror 54 to change its angle in the plane for scanning the modulated laser light, indicated by a dashed line, onto retina 26. Optical fiber 40 is mechanically coupled to MEMS scanner device 52 and both of these elements are, in turn, mechanically coupled to band 60, as shown in previous figures. A distance D between eye E and MEMS scanner device 52 is less than the object focal length $F_o$ of the eye of the viewer. Collimator lens L2 is coupled to the exit terminus of optical fiber 40.

Figure 4C:
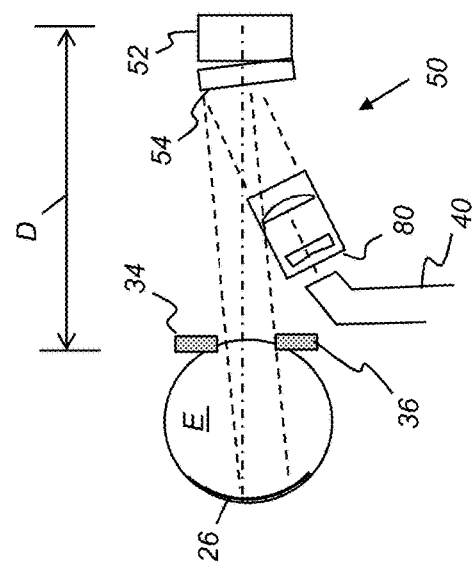
FIGS. 4C and 4D show a scanning apparatus that includes a beam expander and an objective that provides an enlarged beam width for filling a scan mirror and scanning at a larger FOV.
Figure 4D:
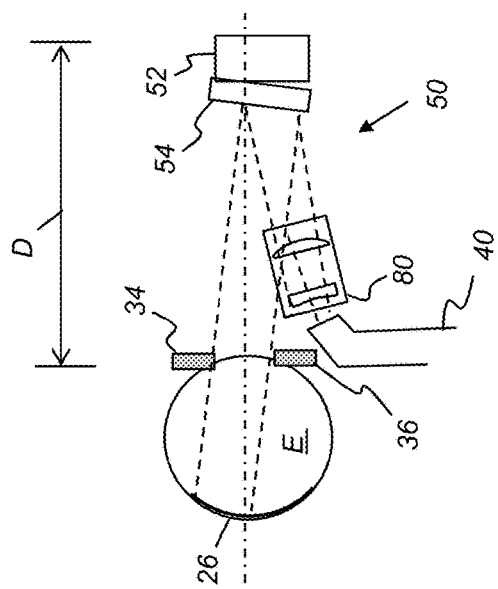

The top view sections of FIGS. 4C and 4D show scanner apparatus 50 with a beam expander 80 in the light path. Beam expander 80 can use refractive components, such as a conventional Galilean arrangement with a negative and a positive lens. Alternately, a reflective configuration using multiple curved mirrors and a beamsplitter can be used for beam expansion. According to an embodiment of the present disclosure, beam expander 80 effectively enlarges the beam width so that the laser light beam fills or substantially fills the pupil of eye E during the scan cycle. The beam width can be expanded to the range 2.5 mm-3 mm or larger, for example. Beam expansion, in turn, enlarges the potential FOV provided by scanner apparatus 50.

MEMS scanner device 52 may be any of a number of types of scanner apparatus known in the imaging arts for forming an image using a scan pattern such as a raster scan. Other scan sequences can alternately be used, including vector scanning, for example. MEMS scanner device 52 can have a single mirror 54, such as a gimbaled mirror for 2-D or two-axis scanning, or may have two tandem mirrors 54, one for directing the beam in each of two orthogonal directions. One exemplary type of scanning mirror is the two-axis scanning mirror that is provided with the Microvision picoprojector system. Another exemplary type of scanning mirror combines two tandem single-axis scanning mirrors, such as the device that is provided with the Maradin Laser Scanning Mirror Module, Maradin, Ltd., Israel, which supports large laser beam diameters. MEMS scanning mirror 54 serves as the last optical element in the path of image-bearing light to the eye and is within the object focal length $F_o$ as described with reference to FIG. 1D.

Figure 4E:
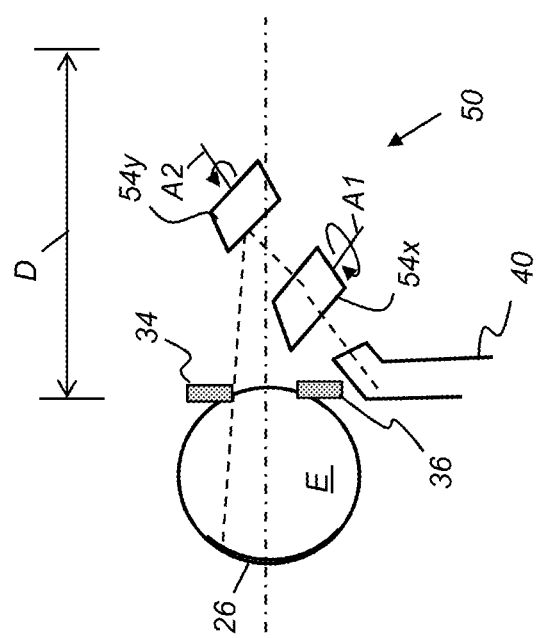
FIG. 4E is a schematic diagram that shows a tandem mirror arrangement of the scanner apparatus.

The schematic diagram of FIG. 4E shows a tandem mirror arrangement of scanner apparatus 50, in which a first mirror 54x scans the beam from optical fiber 40 in the x direction and a second mirror 54y scans in the y direction. Mirrors 54x and 54y each have a single axis of rotation, shown as A1 and A2, respectively. In contrast, mirror 54 in the light path of FIGS. 4A-4D provides two axis scanning using a single mirror, such as using a gimbaled mirror arrangement.

MEMS mirror 54 dimensions can be optimized to expand the field for the virtual image. Optimization methods known to those skilled in the scanning arts can include providing a measure of curvature to the mirror 54 surface. These methods also provide for increasing scanning mirror dimensions and dimensioning the beam width to more completely fill the pupil.

In conventional MEMS scanning devices, due to the requirement for high resonant scanning frequencies for raster scanning, mirrors are typically fabricated to be as small as feasible and are configured to rotate over large scan angles. In contrast to this conventional approach, embodiments of the present disclosure can use larger scanning mirrors, such as scanning mirrors larger than 2 mm diameter in the plane of the scanned beam. In one embodiment, a 3 mm diameter mirror with an average pupil size in bright light of 2.5 mm can provide a 17 degree FOV, equivalent to or greater than the FOV available with conventional commercial devices, offering much larger eye relief, increased size and obstructive lenses in front of the eye. Some amount of vignetting at the pupil is acceptable in order to provide light at angles for the largest possible field, given the geometrical constraints of the scanner apparatus 50. The changes in light intensity on the pupil can be compensated electronically by modulating the intensity of the laser light to provide uniform brightness at each point in the scan interval.

Beam-shaping can alternately be provided for improved resolution and efficiency. Overfilling the MEMS scanning mirror may help to compensate for Gaussian beam characteristics by providing a more homogeneous 'flat top' laser beam profile.

Figure 5A:
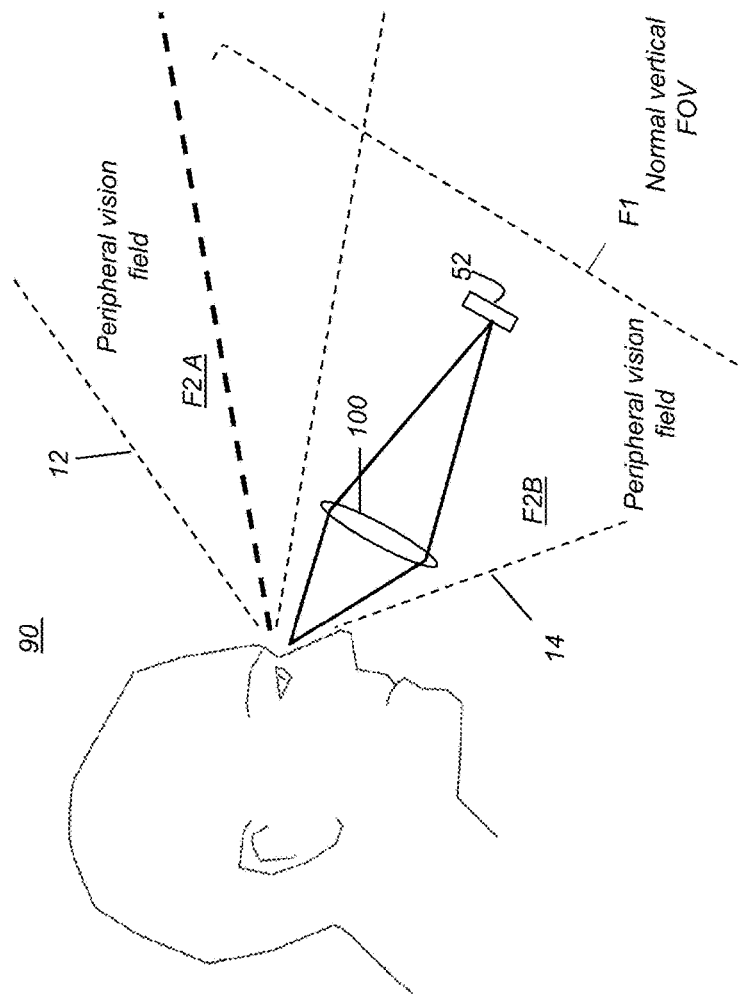
FIG. 5A is a side view showing a wearable imaging apparatus according to an alternate embodiment of the present disclosure.
Figure 5B:
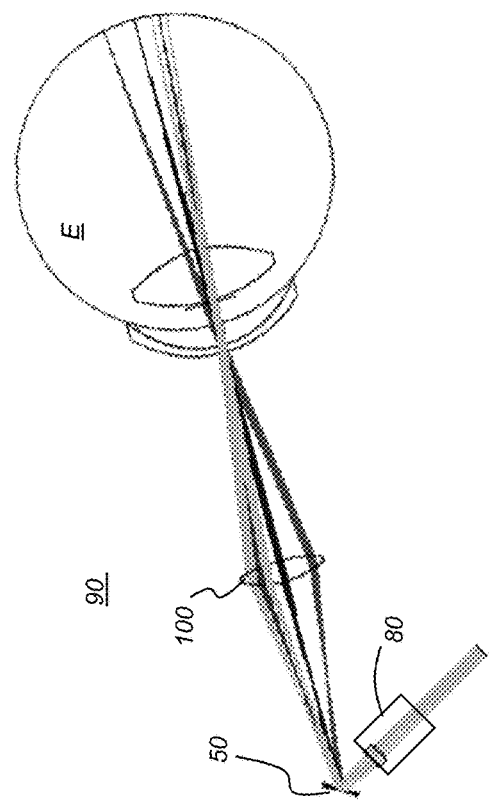
FIG. 5B is a side view cross section showing components of a wearable imaging apparatus according to an alternate embodiment of the present disclosure.

According to an alternate embodiment, as shown in the side view of FIG. 5A and cross-sectional side views of FIGS. 5B and 5C, a wearable imaging apparatus 90 has an optical relay element 100 as the last optical element in the path of image-bearing light, nearest to the eye and within the object focal length $F_o$ as described with reference to FIG. 1D. FIG. 5A shows optical relay element 100 as a singlet lens. In various embodiments, optical relay element 100 can be a lens, a Fresnel lens, a holographic lens, a reflective surface, or a diffractive optical element. The FOV is determined by the size of optical relay element 100 and its distance from the eye. Thus for example if the element has a diameter of 8 mm at a distance of 16 mm from the eye, the full FOV is given by:

2*TAN$^{-1}$(5/16)=28 degrees.

Figure 5C:
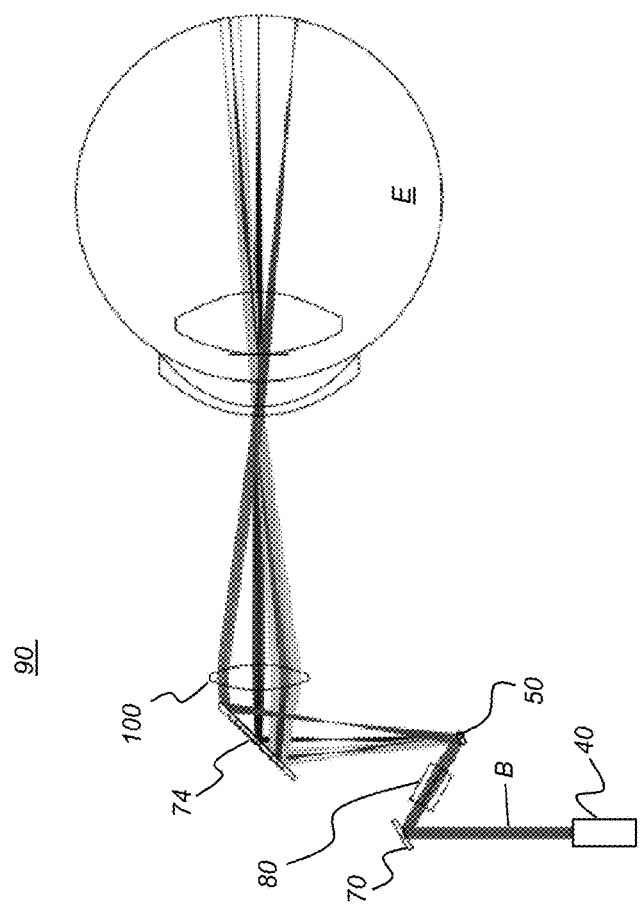
FIG. 5C is a side view cross section showing components of an optical system for a wearable imaging apparatus according to an alternate embodiment of the present disclosure.
Figure 5D:
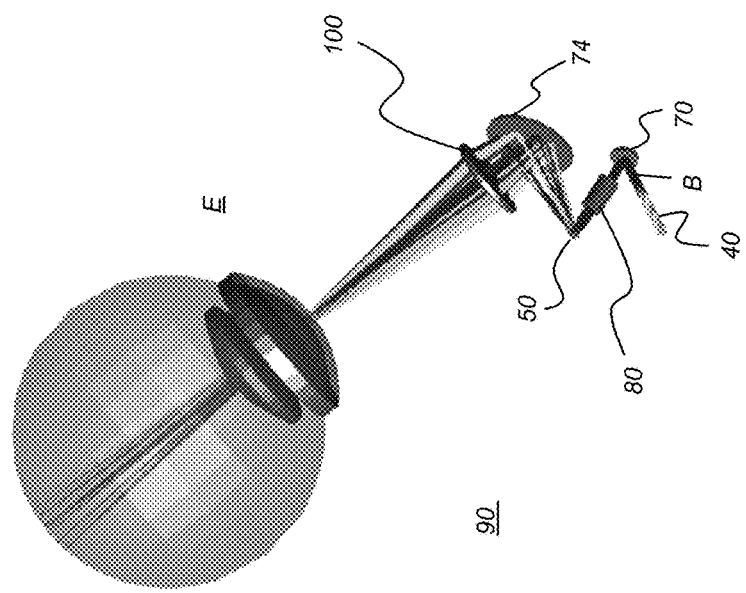
FIG. 5D is a perspective side view showing components of the optical system of FIG. 5C.

In the FIG. 5C embodiment, shown in a perspective side view in FIG. 5D, optical relay element 100 provides 1:1 magnification, which minimizes the total track of the relay for a given focal length. Relay element 100 can be a lens that is within object focal length $F_o$ from eye E. Lens symmetry helps to reduce chief ray aberrations such as pupil coma and pupil distortion. Optical fiber 40 emits a collimated laser RGB beam having a beam diameter of about 0.5 mm. A mirror 70 reflects this light to a beam magnifier 80 that has the basic optical arrangement of a Galilean telescope, such as a single lens with a concave input surface and concave output surface. Acting as a beam expander and objective lens, beam magnifier 80 focuses the beam at about half the distance from scanner apparatus 50 and relay element 100, with the optical path folded at folding mirror 74. This arrangement enables relay element 100 to collimate the beam so that the eye sees collimated beams for all field angles converging at the cornea. A relay element 100 that is a lens at 8 mm would provide a field of view of approximately 16 degrees.

For the FIG. 5C embodiment, one or more folding prisms can be used to replace fold mirrors 70, 74. The folding mirror 74 can be combined with a refractive relay element 100, effectively providing the field plane within a relay lens assembly.

According to an alternate embodiment, a catoptric relay apparatus, such as that described in U.S. Pat. No. 5,309,276 to Rodgers entitled "Catoptric Optical System Including Concave and convex Reflectors", incorporated herein by reference, can alternately be used as an angle reducing relay for optical relay element 100.

Figure 6:
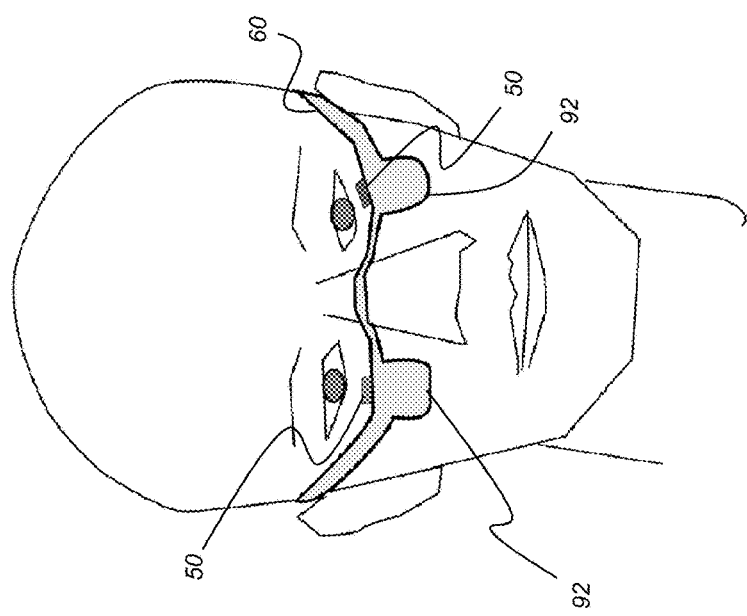
FIG. 6 is a front view that shows the support band according to an alternate embodiment.

FIG. 6 is a front view that shows an arrangement of retaining band 60 according to an alternate embodiment. An extension housing 92, resting against the face below each eye, provides additional space for optical components that must be positioned close to the viewer's eyes, including elements of scanner apparatus 50. Thus, optical scanner apparatus 50 components can be supported against the face of the viewer, below the infraorbital rim of each eye. No components for forming a virtual image need to be above eye level, that is, above the horizontal line of sight as defined previously.

Band 60 is designed to suitably dispose components of scanning apparatus 50 so that mirror 54 is properly positioned and oriented for directing image-bearing light into the eyes E of the viewer when the viewer lowers the eyes toward the mirror 54 for viewing the virtual image that is formed by wearable imaging apparatus 10.

Modulation of the laser light beam can be performed by direct modulation of the lasers within light module 30 (FIG. 2) or using a light modulator or other methods for control of beam pulse intervals familiar to those skilled in the imaging arts.

Aim Adjustment

Due to anatomical differences between individual viewers, such as differences in facial structure, inter-pupil distance (IPD), and other factors, wearable imaging apparatus 10 is adaptable and adjustable for band 60 positioning and, where needed, for alignment of scan geometry. Padding or other cushioning members, not shown, can be added to compensate for individual differences in cheekbone anatomy, for example. Band 60 can be formed from or onto a stiff material, such as a bendable wire supporting frame that can be shaped to conform to the viewer's face and even individually shaped to direct the scanned beam vertically and horizontally to each individual viewer as needed.

Optionally, wearable imaging apparatus 10 can be fitted to the individual viewer, such as by being aligned in vertical and horizontal directions using screws or other adjustment mechanism.

The term "exemplary" is used herein to mean "serving as an example, instance, or illustration." Any aspect described herein as "exemplary" is not necessarily to be construed as preferred or advantageous over other aspects.

The invention has been described in detail with particular reference to a presently preferred embodiment, but it will be understood that variations and modifications can be effected within the spirit and scope of the invention. For example, although the above description concentrates on forming an image for one eye, it can be readily understood that corresponding elements and logic are used for forming the stereoscopic images needed to form and coordinate image content for both right- and left-eye images, using methods familiar to those skilled in the stereoscopic imaging arts. The images that are formed can be stereoscopic or biocular, that is, with the same image content provided to both eyes for monoscopic display.

The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A wearable display apparatus for forming an image through an eye lens at a retina of an eye of a user, said wearable display apparatus comprising:
    a support structure supporting an optical system and engaging, through a user's facial skin, at least one cheekbone of the user, said optical system including:
        a scanning apparatus that is capable of scanning a modulated laser to provide a scanned modulated laser illumination in at least two dimensions; and
        a relay lens through which the scanned modulated laser illumination is provided directly to the retina of the user, wherein the scanned modulated laser illumination is provided as collimated illumination to the eye lens and is further provided to the retina as a virtual image, and wherein the relay lens is provided a distance from a human lens of the eye of no more than 16.7 mm.

2. The wearable display apparatus as claimed in claim 1, wherein said support structure further includes a band portion that engages sides of a user's head.

3. The wearable display apparatus as claimed in claim 2, wherein said band portion includes a conformal band.

4. The wearable display apparatus as claimed in claim 3, wherein said optical system includes an additional scanning apparatus that is capable of scanning an additional modulated laser to provide an additional scanned modulated laser illumination in at least two dimensions to an additional eye, and an additional relay lens through which the additional scanned modulated laser illumination is provided directly to an additional retina of the user, wherein the additional relay lens is provided a distance from a human lens of the additional eye of no more than 16.7 mm.

5. The wearable display apparatus as claimed in claim 1, wherein the relay lens is a singlet lens.

6. The wearable display apparatus as claimed in claim 1, wherein no image is formed that is viewed by the eye of the user until a virtual image is formed directly on the retina of a user.

7. The wearable display apparatus as claimed in claim 1, wherein the optical system is provided on the support structure that engages the at least one cheekbone of the user.

8. A wearable display apparatus for forming an image at a retina of an eye of a user, said wearable display apparatus comprising:
   a support structure supporting an optical system and engaging, through a user's facial skin, at least one cheekbone of the user, said optical system including:
      a scanning apparatus including at least one mirror for scanning a modulated laser to provide a scanned modulated laser illumination in at least two dimensions; and
      a relay lens through which the scanned modulated laser illumination is provided as collimated illumination to an eye lens of the eye of the user and thereby directly to the retina of the user, wherein the scanned modulated laser illumination is provided to the retina as a virtual image, and wherein the relay lens is provided a distance from a human lens of the eye of no more than 16.7 mm.

9. The wearable display apparatus as claimed in claim 8, wherein said support structure further includes a band portion that engages sides of a user's head.

10. The wearable display apparatus as claimed in claim 9, wherein said band portion includes a conformal band.

11. The wearable display apparatus as claimed in claim 10, wherein said optical system includes an additional scanning apparatus that is capable of scanning an additional modulated laser to provide an additional scanned modulated laser illumination in at least two dimensions to an additional eye, and an additional relay lens through which the additional scanned modulated laser illumination is provided directly to an additional retina of the user wherein the additional relay lens is provided a distance from a human lens of the eye of no more than 16.7 mm.

12. The wearable display apparatus as claimed in claim 8, wherein the relay lens is a singlet lens.

13. The wearable display apparatus as claimed in claim 8, wherein no image is formed that is viewed by the eye of the user until a virtual image is formed directly on the retina of a user.

14. The wearable display apparatus as claimed in claim 8, wherein the optical system is provided on the support structure that engages the at least one cheekbone of the user.

15. A method of providing an image directly onto a retina of an eye of a user, said method comprising the steps of:
   providing modulated laser illumination;
   scanning the modulated laser illumination using at least one mirror on a support structure that engages through a user's facial skin, at least one cheekbone of the user; and
   providing, directly to the retina of the user, scanned modulated laser illumination from the at least one mirror using a focal relay lens, wherein the scanned modulated laser illumination is provided as collimated illumination to an eye lens of a user and is further provided to the retina as a virtual image, and wherein the relay lens is provided a distance from a human lens of the eye of no more than 16.7 mm.

16. The method as claimed in claim 15, wherein said method further includes the step of securing the support structure to the user using a band that engages the user's head.

17. The method as claimed in claim 15, wherein the relay lens is a singlet lens.

18. The method as claimed in claim 15, wherein no image is formed that is viewed by the eye of the user until a virtual image is formed directly on the retina of a user.

19. The method as claimed in claim 15, wherein the steps of providing the modulated laser illumination, scanning the modulated laser illumination, and providing the scanned modulated laser illumination all occur on the support structure that engages the at least one cheekbone of the user.

* * * * *